United States Patent [19]
Martin et al.

[11] Patent Number: 5,481,174
[45] Date of Patent: Jan. 2, 1996

[54] METHOD OF RAPIDLY CHARGING A LITHIUM ION CELL

[75] Inventors: Lara J. Martin, Newport News, Va.; Scott M. Garrett, Boca Raton, Fla.

[73] Assignee: Motorola, Inc., Schaumburg, Ill.

[21] Appl. No.: 172,975

[22] Filed: Dec. 27, 1993

[51] Int. Cl.⁶ .................................................. H02J 7/10
[52] U.S. Cl. .................................................. 320/14; 320/21
[58] Field of Search ............................. 320/2, 5, 14

[56] References Cited

U.S. PATENT DOCUMENTS

| | | |
|---|---|---|
| 3,895,283 | 8/1975 | Peterson . |
| 4,354,148 | 10/1982 | Tada et al. . |
| 4,385,269 | 5/1983 | Aspinwall et al. ............ 320/14 |
| 4,467,265 | 8/1984 | Hierholzer . |
| 4,736,150 | 4/1988 | Wagner ......................... 320/21 |
| 4,742,289 | 5/1988 | Wahlström ..................... 320/14 |
| 4,746,852 | 5/1988 | Martin ........................... 320/20 |
| 5,130,634 | 7/1992 | Kasai . |
| 5,307,000 | 4/1994 | Podrazhansky et al. ...... 320/14 |

Primary Examiner—Steven L. Stephan
Assistant Examiner—Nicholas Ponomarenko
Attorney, Agent, or Firm—Kenneth M. Massaroni; Scott M. Garrett

[57] ABSTRACT

A battery charger for lithium ion cells closely monitors cell voltage, and charge time, so as to avoid the over-application of charge to the cell. Charge pulses (104) are followed by a first rest (110), a discharge (112) and a second rest, (120) period prior to re-initiating the charge pulse. If the battery voltage reaches a preselected maximum, in less than a pre-selected period of time, the charge pulse is reduced by a preselected minimum factor. Cycling of the cell is continued until the cells are fully charged.

15 Claims, 3 Drawing Sheets

METHOD OF RAPIDLY CHARGING A LITHIUM ION CELL

TECHNICAL FIELD

This invention relates in general to battery charging techniques, and more specifically to a method for rapidly charging a lithium ion battery.

BACKGROUND

There has been a great deal of interest in developing better and more efficient methods for storing energy for applications such as radio communication, satellites, portable computers, and electric vehicles to name but a few. Accordingly, there have been recent concerted efforts to develop high energy, cost effective battery cells having improved performance characteristics.

Rechargeable, or secondary cells, are more desirable than primary (non-rechargeable) cells since the associated chemical reactions which take place at the positive and negative electrodes of the battery are reversible. Accordingly, electrodes for secondary cells are capable of being regenerated (i.e. recharged) many times by the application of an electrical charge. Numerous advanced battery systems have been developed for storing electrical charge thereon. Concurrently, much effort has been dedicated the development of electrical battery charging systems adapted to apply charging currents to these different battery systems. As the electrochemical nature of battery systems differ significantly, different battery chargers are necessary to address the different types of battery charging needs.

Many battery chargers today use a dual rate charge sequence in which the battery under charge is charged at a fast rate for a period of time, and then charged at a slower or "trickle" rate once the battery has reached a predetermined charge level. This particular charging regime has been particularly successful on Nickel-Cadmium (NiCd), and Nickel- metal hydride (NiMH) systems.

FIG. 1 illustrates a flow chart showing a prior art battery charging routine, particularly adapted for use with NiCd and NiMH secondary batteries systems. In step 12, the battery is inserted into the charging device. The charger in step 14 then determines the charge capacity of the battery by sensing the resistance of a capacity resistor ($R_c$) which is located in the battery itself. Also, the temperature of the battery is sensed by sensing the resistance of a thermistor which is located inside the battery. If the measurements taken in step 14 are within pre-selected acceptable parameters, the charge sequence is enabled. If the values are not within the pre-selected parameters, the charger moves to step 18 and indicates a fault condition. The charger user is informed of the fault condition by, for example, observing an illuminated fault condition light emitting diode located on the charger.

Assuming no fault condition exists, the rapid charge sequence is initiated as illustrated in step 20. The temperature and voltage of the charged battery is monitored by a charge monitor device. Specifically, in step 22, the charger monitors the change in slope of the battery temperature to determine if the rapid charge rate is to be discontinued. Alternatively, or in addition, the charger could also monitor for changes in battery voltage. When the slope of the battery charging curve becomes negative, the battery is charged.

If battery temperature as determined by the charger reaches a predetermined value, the rapid charge sequence is terminated, in order to prevent overheating of the battery. The charger is then placed in a trickle-charged mode as illustrated in step 24. In the trickle-charge mode, the battery is charged at the rate of approximately C/10 to C/20, where "C" is the capacity of the battery. For example, if the battery has capacity of 1,000 maH at a C/10 charge rate, the charger would charge the battery using a current of 100 maH.

This charging regime does not, however, work well with Lithium ion cells. This is due to the fact that Lithium ion cells cannot withstand rapid charging techniques. Moreover, Lithium ion cells have demonstrated a propensity to explosively fail upon the application of excessive charging voltages. Lithium-ion cells have unique characteristics which make rapid charging difficult. For example, a voltage limit of approximately 4.2 V is imposed by all manufacturers for safety reasons. Further, continuous high current (i.e., greater than the cells 1C rate where "C" is the cell's capacity) causes metal lithium to plate onto the electrode. This permanently reduces the cell's capacity.

The recommended charging regime for Lithium ion cells is therefore a constant current/constant voltage approach, which, as recommended by manufacturers, takes 2½ to 3 hours to complete. Further, conventional charging regimes for Lithium ion cells tend to heat the batteries, which in turn causes the battery's useful life to be shortened.

Accordingly, there exists a need for a method to efficiently, rapidly, and most importantly, safely, charge Lithium ion electrochemical cells.

SUMMARY OF THE INVENTION

Briefly, according to the invention, there is provided a method for rapidly charging a Lithium ion electrochemical cell. The method comprises the steps of providing a Lithium-ion cell in a charging device, which applies an electrical charge pulse to the cell. The duration of the pulse will be for a period which is the lesser of either a pre-selected maximum charge time, or the time in which it takes the cell to reach a pre-selected maximum cell voltage. After terminating the charging pulse, the cell is afforded a brief rest period during which no load or current is applied to the cell. Following the rest period, a discharge pulse may be applied to the Lithium ion cell for a pre-selected period of time. Alternatively, the discharge pulse may be terminated if a predetermined minimum cell voltage is reached.

The discharge may be followed by a second rest period. The charge-rest-discharge-rest sequence may be repeated several times in order to bring the cell to full charge. As the charge-rest-discharge-rest cycle is repeated, the current of the applied charge pulse is decreased if the charge pulse is terminated prior to a pre-selected minimum time to reach the pre-selected maximum cell voltage.

DETAILED DESCRIPTION OF THE PREFERRED EMBODIMENT

Figure 1:
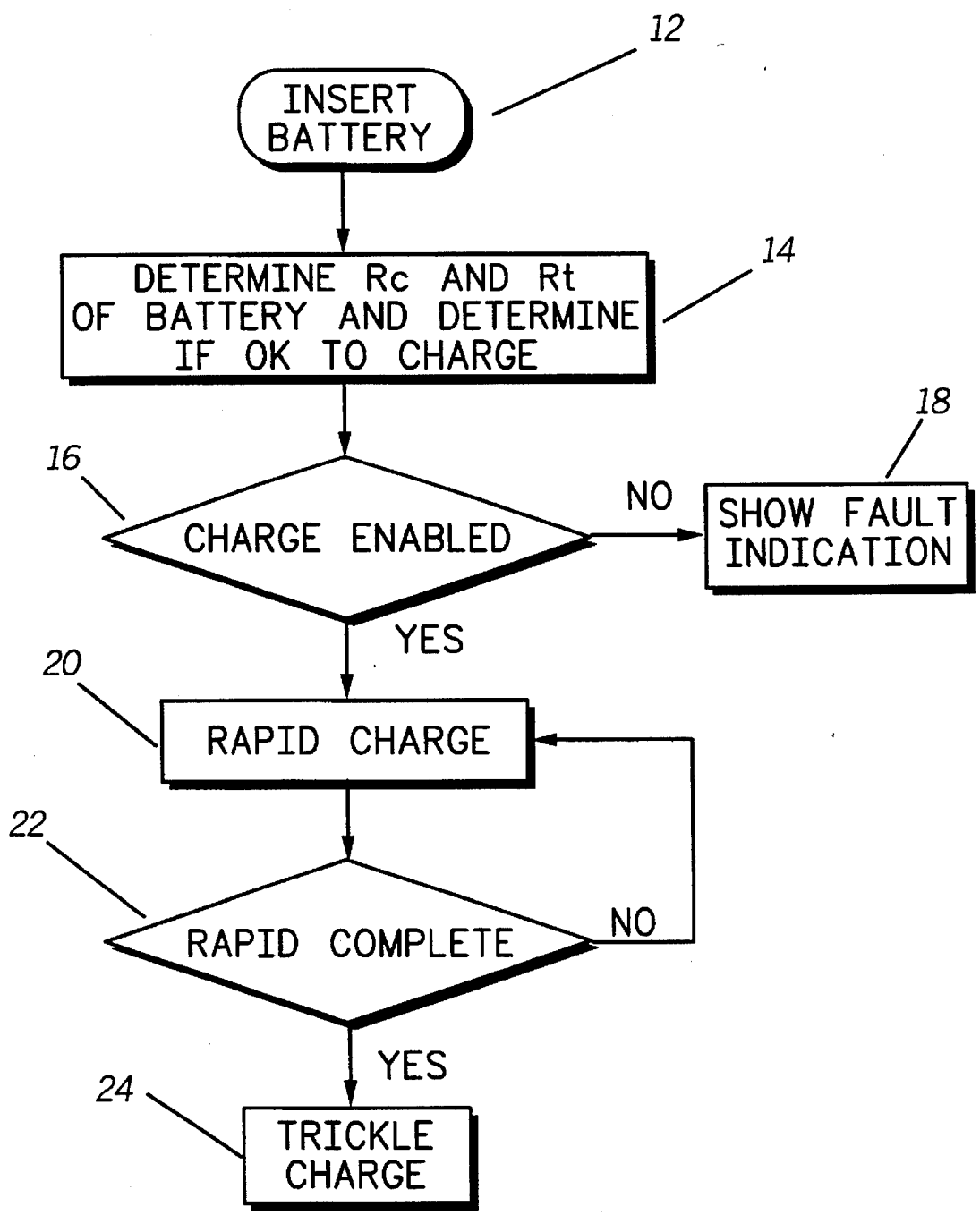
FIG. 1 is a flow chart of the operation of a prior art battery charger.

While the specification concludes with claims defining the features of the invention that are regarded as novel, it is believed that the invention will be better understood from a consideration of the following description in conjunction with the drawing figures, in which like reference numerals are carried forward.

The method for rapidly, and safely charging lithium ion rechargeable cell consists essentially of four basic steps: applying a charge current pulse for a period of time (tc); applying a first rest period ($t_r1$), following the charge pulse current; applying a discharge pulse for a period of time having a duration of (td), following the first rest period; and a second rest period ($t_{r2}$). In one embodiment of the invention, the total time for this cycle ($t_c$-$t_{r1}$-$t_d$-$t_{r2}$) is approximately twenty seconds, with the rest and discharge periods being approximately 5% each of the total maximum cycle time.

Figure 2:
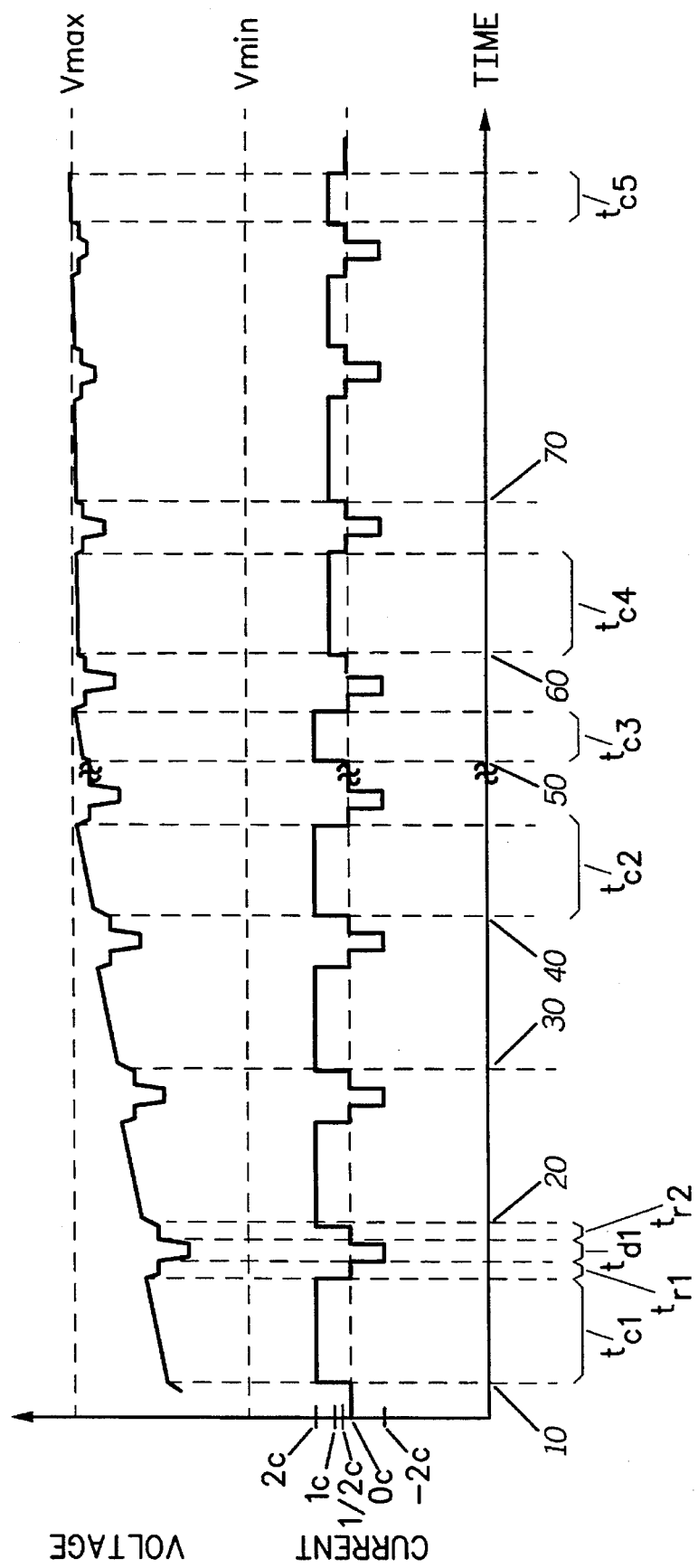
FIG. 2 is a graph illustrating the current and the voltage profile vs. time for a Lithium ion battery charging method in accordance with the present invention.

Referring now to FIG. 2, there is illustrated therein the current and voltage profile vs. time for a lithium ion cell charged in accordance with the instant invention. A single charge-rest-discharge-rest cycle is illustrated between points 10 and 20. An initial charge pulse of, for example, approximately 2 CmA is applied to the cell during time period $t_{c1}$. The duration of $t_{c1}$ may be between 5 and 15 seconds, unless $t_{c1}$. The duration of $t_{c1}$ may be between 5 and 15 seconds, unless terminated sooner, as described below. This is followed by the first rest period $t_{r1}$ for a period of time of approximately 0.5–3.0 seconds during which no charge is applied. Thereafter, a discharge pulse is applied to the cell for a discharge time td, the duration of which may be, for example, between 1–5 seconds, or until cell voltage drops to a preselected minimum voltage $V_{min}$, of approximately 2.5 volts. The cell is then allowed a second rest period, $t_{r2}$, of approximately 0.5–3 seconds. The cycle is then repeated as between points 20–30, 30–40 . . . 60–70.

Referring to FIG. 2, the cell voltage should not exceed a maximum voltage, $V_{max}$ of about 4.2 volts, while the charge pulse is applied. If $V_{max}$ is reached before a preselected maximum duration of $t_c$, the charging pulse is terminated, advancing to the first rest period. This occurrence is illustrated in FIG. 2 at point $t_{c2}$. Cycling will continue with an applied charge pulse of, for example, 2C until $V_{max}$ is reached in less than a preselected minimum time. This occurrence is illustrated in FIG. 2 at $t_{c3}$. This minimum time may be between 1 and 10 seconds.

When the charge pulse is terminated prior to the preselected minimum charge time, the applied charge pulse is reduced by a factor of, for example, one half. This is illustrated at $t_{c4}$, when applied charge pulse is shown as reduced to 1C. The preselected minimum charge time is the time at which the charge pulse puts into the cell the same amount of charge the discharge pulse removes. The initial rate of the charge pulse is higher than the C rate of the battery, and in a preferred embodiment may be 2C.

Cycling will then continue with the reduced charge pulse until $V_{max}$ is again reached in less than the preselected minimum time. After that point, illustrated at $t_{c5}$, the applied charge may be again reduced by one half to C/2. Alternatively, charging may be terminated as illustrated in FIG. 2. If charging is not terminated, cycling will continue until $V_{max}$ is again reached in less than the preselected minimum time. At this point the charge process term is complete, is terminated, and the cell has in excess of 90% of its maximum capacity when discharged at the C rating.

Figure 3:
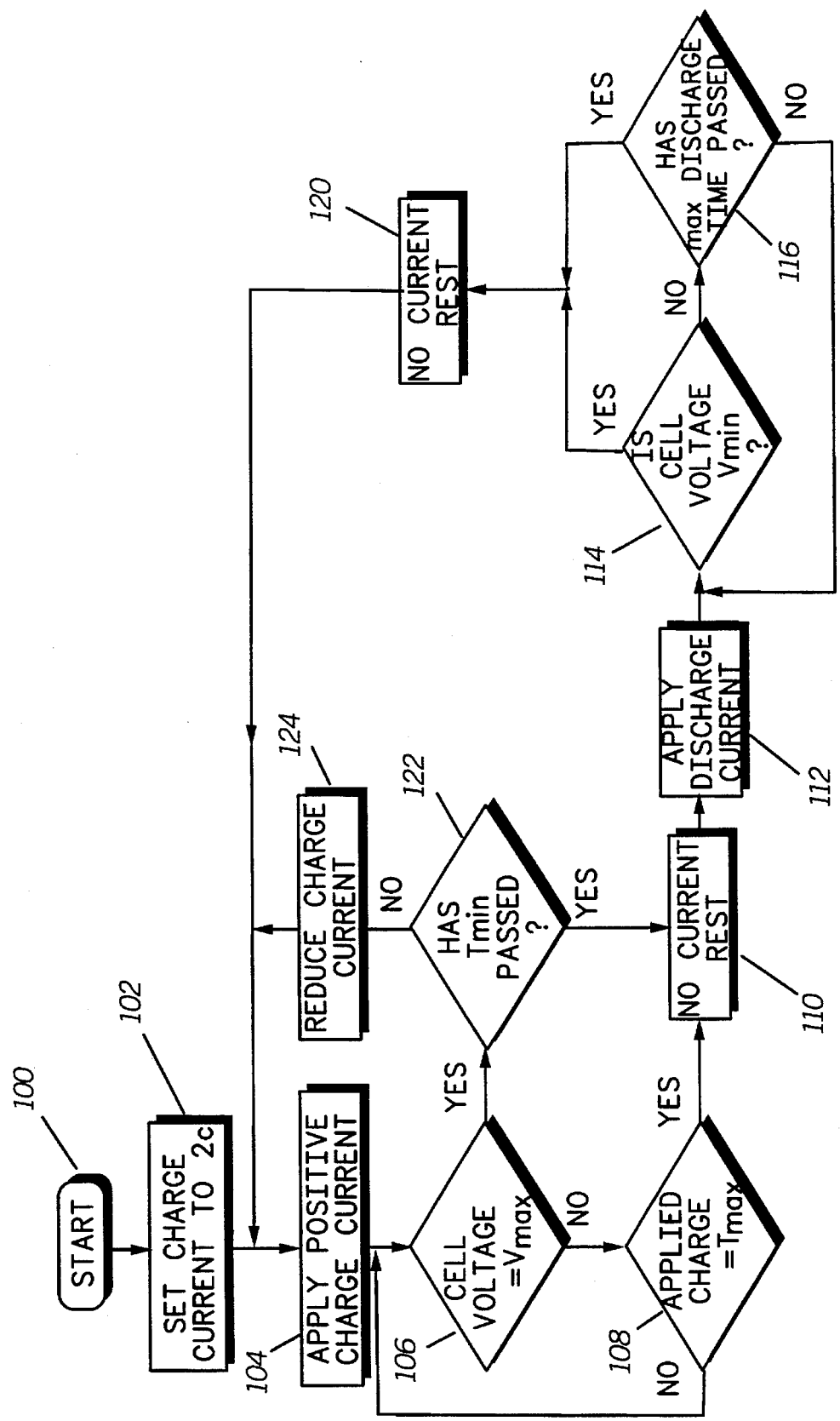
FIG. 3 is a flow chart illustrating the steps for rapidly charging a lithium ion battery in accordance with the invention.

FIG. 3 is a flow chart illustrating the steps of the instant charging method. The charging regime starts at Box 100 when one or more lithium ion cells are placed into a charging apparatus. Assuming no fault indication is received, the charging apparatus will set charge current to a preferred maximum charge current, such as, for example, 2C. This step is illustrated in Box 102 of FIG. 3. Having set the charge current, Box 104 illustrates the step of initiating, and applying positive charge current. Positive charge current will continue to be applied to the cell until one of two conditions is satisfied: (1) the cell voltage has reached a predetermined maximum voltage, $V_{max}$; or (2) the positive charge current has been applied for a pre-selected maximum time, $T_{max}$. These steps are illustrated in Boxes 106 and 108 respectively. For purposes of this example, $V_{max}$ is at least about 4.2 volts, and $T_{max}$ is at least about 15 seconds. Assuming that $V_{max}$ is not reached, but that $T_{max}$ is reached, then, as illustrated in Box 110 the first rest period is applied.

After the first rest period, which may be approximately 1 second in duration, the cell is discharged at a preselected rate of, for example, 2C for a period of time between about 0.5 and 5 seconds, and preferably about 1 second. This step is illustrated in Box 112. The precise cell discharge time depends upon the occurrence of one of the two following events: (1) the cell voltage drops to less than a minimum voltage ($V_{min}$) of about 2.5 volts; or (2) a preselected maximum time has passed. These two steps are illustrated in Boxes 114 and 116 respectively.

If the cell voltage drops below $V_{min}$ as illustrated in Box 114, the discharge pulse is terminated and a rest cycle is initiated for a period of approximately one second, as illustrated in Box 120. If the cell voltage is not less than $V_{min}$, the charging apparatus determines whether or not the preselected maximum discharge time has passed. If the preselected maximum discharge time has passed, the discharge pulse is terminated and the rest cycle of Box 120 is initiated. If both criteria are not satisfied, the cell discharge continues until such time as at least one is. Following the second rest cycle illustrated in Box 120, the cycle described above with respect to Boxes 104–120 is repeated.

The steps illustrated in Boxes 106 and 108, are critical for determining overall state of charge on the lithium ion cell being charged. If, for example, the charge applied at Box 104 results in cell voltage of more than $V_{max}$, the apparatus will next determine whether or not a preselected minimum time period of, for example, one second, has elapsed. This step is illustrated in Box 122. If a minimum pre-selected time period, such as one second, has passed, the charging method advances to the next state, namely the rest cycle illustrated in Box 110. If the minimum time period is not exceeded, then the positive charge current is reduced by a factor of one-half. This is illustrated in Box 124, after which time the positive charge pulse illustrated in Box 104 is re-initiated at the new reduced charge current. The cycle illustrated by boxes 104–124 continues until the cell is substantially, fully charged. This is more particularly illustrated in FIG. 2.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

We claim:

1. A method for rapidly charging a Lithium ion electrochemical cell, said method comprising the steps of:

(i) providing a Lithium ion electrochemical cell;

(ii) applying an electrical charge pulse current to said electrochemical cell, said charge pulse terminating upon the occurrence of either a pre-selected maximum charge time, or a pre-selected maximum cell voltage;

(iii) providing a rest period during which no load or current is applied to said cell; and (iv) applying a discharge pulse to said electrochemical cell, said discharge pulse terminating upon the occurrence of either a pre-selected discharge period of time, or a pre-selected minimum cell voltage.

2. A method as described in claim 1, including the further step of providing a second rest period after applying said discharge pulse.

3. A method as described in claim 2, including the further step of repeating said charge, rest, and discharge steps.

4. A method as described in claim 3, including the further step of decreasing the charge pulse current when said pre-selected maximum cell voltage is reached in less than a pre-selected minimum charge time.

5. A method as described in claim 4, including the further step of charging said electrochemical cell until a pre-selected minimum charge pulse current causes said cell to reach said pre-selected maximum cell voltage in less than said pre-selected minimum charge time.

6. A method as described in claim 1, wherein the initial charge pulse current is 2C.

7. A method as described in claim 2, wherein one charge-rest-discharge-rest cycle has a duration of between 10 and 60 seconds.

8. A method as described in claim 7, wherein said pre-selected maximum charge time is at least about 80% of the total charge-rest-discharge-rest cycle.

9. A method as described in claim 1, wherein said pre-selected maximum cell voltage is 4.2 volts.

10. A method as described in claim 2, wherein the duration of the discharge pulse is between 0.5 and 5.0 seconds.

11. A method as described in claim 4, wherein the charge pulse current is reduced by a factor of ½ when said pre-selected maximum cell voltage is reached in less than the pre-selected minimum charge time.

12. A method as described in claim 1, wherein said pre-selected minimum cell voltage is 2.5 V.

13. A method for rapidly charging a lithium ion electrochemical cell, said method comprising the steps of:

providing a lithium ion electrochemical cell;

applying an electrical charge pulse current to said electrochemical cell, said charge pulse terminating upon the occurrence of either a pre-selected maximum charge time, or a pre-selected maximum cell voltage;

providing a first rest period during which no load or current is applied to said cell;

applying a discharge pulse to said electrochemical cell said discharge pulse terminating upon the occurrence of either a pre-selected minimum cell voltage, or a pre-selected discharge period of time; and providing a second rest period during which no load or current supply to said cell; and repeating said charge-rest-discharge-rest cycle until said electrochemical cell is substantially completely charged.

14. A method as described in claim 13 including the further step of decreasing the charge pulse current when said pre-selected maximum cell voltage is reached in less than a pre-selected minimum charge time.

15. A method as described in claim 14, including the further step of charging said electrochemical cell until a pre-selected minimum charge pulse current causes said cell to reach said pre-selected maximum cell voltage in less than said pre-selected minimum charge time.

* * * * *